United States Patent [19]

Jakobsen

[11] 4,107,454

[45] Aug. 15, 1978

[54] APPARATUS FOR PNEUMATICALLY COMMUNICATING WITH A PRESSURIZED CABLE

[75] Inventor: William Jakobsen, Northport, N.Y.

[73] Assignee: Lourdes Industries, Inc., Hauppauge, N.Y.

[21] Appl. No.: 758,922

[22] Filed: Jan. 3, 1977

[51] Int. Cl.² ............................................. H02G 15/20
[52] U.S. Cl. ................................... 174/135; 137/317; 174/11 R; 251/146; 285/197
[58] Field of Search ............... 174/8, 11 R, 23 R, 135; 138/90, 92, 94; 285/180, 197, 198, 199; 137/317, 217, 320; 251/145, 146

[56] References Cited

U.S. PATENT DOCUMENTS

| | | | |
|---|---|---|---|
| 1,334,408 | 3/1920 | Shrauger | 251/146 |
| 1,368,970 | 2/1921 | Roberts et al. | 285/197 X |
| 3,730,209 | 5/1973 | Binard et al. | 285/197 X |
| 3,918,748 | 11/1975 | Acda | 285/197 X |

Primary Examiner—Laramie E. Askin
Attorney, Agent, or Firm—Posnack, Roberts, Cohen & Spiecens

[57] ABSTRACT

Apparatus is provided for pneumatically communicating with a pressurized cable provided with a peripheral opening. The apparatus includes a saddle of resilient material having a cross-section defined by a parabola and the arc of a circle. The saddle is adapted to sit astride the cable in surrounding relationship with the opening. A pneumatic fitting is molded into the saddle in generally parallel relationship with the cable. The saddle is provided with a bore communicating with the fitting and generally perpendicular thereto. The bore communicates with the opening in the cable. A sealing compound is provided between the saddle and the cable and the saddle is held on the cable by a pair of straps holding a metal strip against the saddle. An orientation protrusion is located on the saddle in alignment with the bore and protruding through an opening provided in the strip.

17 Claims, 6 Drawing Figures

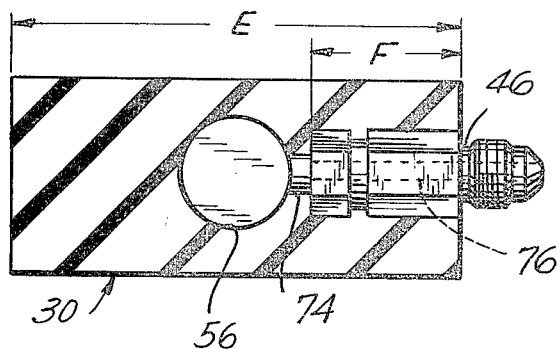
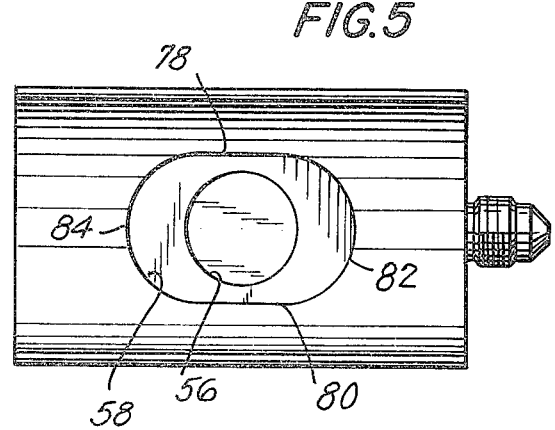
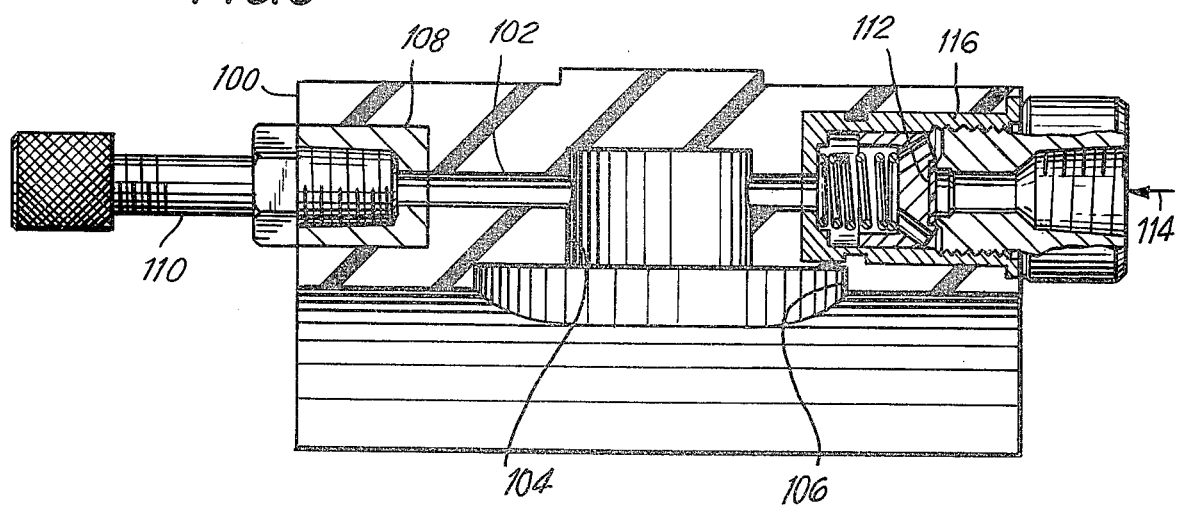

APPARATUS FOR PNEUMATICALLY COMMUNICATING WITH A PRESSURIZED CABLE

FIELD OF THE INVENTION

This invention relates to apparatus for pneumatically communicating with a pressurized cable provided with a peripheral opening.

BACKGROUND OF THE INVENTION

In the field of telephone communications, and particularly with reference to underground installations, much use is made of pressurized cables. The reason for this is that by maintaining cables under pressure, conductors contained therein are, to a great extent, shielded from the effects of surrounding moisture and fluids contained in the ground through which the cables pass. Specifically, such moisture and fluids are prevented from entering pressurized cables by virtue of the pneumatic pressure therein, which tends to serve as a barrier against the penetration of mobile foreign elements.

There are already known devices for introducing pressurized media into and bleeding pressurized media from pressurized cables. These devices serve as well for measuring cable gas pressure and sealing holes made in flash-testing cable. These devices also serve for injecting materials in making cable pressure plugs and for injecting reclamation compounds when reclaiming wet buried PIC cable. Such devices are furthermore used for repairing minor sheath breaks.

In the Bell System Practices Handbook, Section 637-235-201, Issue 4, Mar. 1973, published by American Telephone & Telegraph Co., 1973, there is illustrated a particular coupling which serves the purposes enumerated hereinabove. This coupling will be discussed in greater detail hereinafter, with reference to the accompanying drawing. It serves its purpose in a generally acceptable manner, but there are various problems encountered with this coupling which is the purpose of the present invention to avoid.

More particularly, the above-noted coupling affords problems due to the employment of a vertical pneumatic port which requires an elbow fitting to be installed for proper use. This results in a protrusion of molded rubber with a vertical bushing and fitting which are frequently destroyed or damaged due to their exposure vertically above the cable and coupling. More particularly, these fittings are known to be knocked or kicked off as well as cracked due to maintainance personnel working on the cables or fittings.

Moreover, the known fitting is subject to detachment of metal parts from the saddle employed therein by virtue of the fact that there is insufficient engagement between the metal parts and saddle.

Still further, the known fitting is of limited use having but a single metal fitting generally suitable for performing the single limited function of leading a gaseous medium into a cable or bleeding the gaseous medium therefrom under appropriate circumstances.

SUMMARY OF THE INVENTION

It is an object of the invention to provide an improved apparatus for pneumatically communicating with a pressurized cable provided with a peripheral opening therein.

Yet another object of the invention is to provide an improved apparatus for pneumatic communication with a pressurized cable, which apparatus is provided with a longitudinally disposed pneumatic porting.

Still another object of the invention is to provide an improved coupling wherein all connections are made below the top of a shielding structure provided in the form of a saddle, whereby no protrusions of fittings or tubing are exposed to external damaging forces.

Still another object of the invention is to provide an improved coupling or fitting wherein a superior connection is provided between metal parts and the saddle in which they are contained.

Yet another object of the invention is to provide an improved saddle wherein the metal fittings are characterized by a high break-away torque.

Still another object of the invention is to provide an improved saddle structure wherein the metal fitting is parallel to the associated cable, rather than perpendicular to the associated cable, as in the prior art.

Yet another object of the invention is to provide for a saddle having an improved coupling to the opening in the associated cable which is to be serviced.

According to a feature of the invention, the aforesaid fitting can be molded directly in the saddle in contrast to the prior art in which a bushing is molded into the saddle and a fitting threadably connected therewith. Of course, in accordance with the invention, it is also possible to employ a molded bushing with which a threaded connection is made relative to a fitting.

According to another feature of the invention, a check valve may be employed in protected position, and two fittings can be accommodated within the saddle which is provided.

To achieve the above and other features of the invention, there is provided an apparatus for pneumatically communicating with a pressurized cable provided with a peripheral opening, said apparatus comprising a saddle of resilient material adapted to sit astride said cable in surrounding relationship with the aforesaid opening, and a pneumatic fitting in said saddle in generally parallel relationship with said cable. The saddle may be provided with a bore communicating with said fitting and generally perpendicular thereto, said bore being adapted to communicate with said opening.

According to a feature of the invention, the saddle is preferably of a material having a durometer of about 60–80, Shore A scale. There may furthermore be provided a metal strip, at least substantially covering the saddle, with spaced straps holding said strip against said saddle and holding said saddle on the aforesaid cable. A sealing compound may be provided between the saddle and cable.

According a further feature of the invention, an orientation means may be provided on the saddle in alignment with the aforesaid bore and protruding through a hole provided in the aforesaid strip.

A hose may be connected to the above-noted fitting and both the fitting and hose will be shielded within the profile of the saddle, which has a maximum thickness providing for the accommodation, height-wise, of said hose and fitting.

According to a further embodiment of the invention, a second pneumatic fitting may be provided generally coaxial with the first said fitting and communicating with the aforenoted bore, said fittings being in a generally T-shaped relationship with the bore.

According to one feature of the invention, the fitting is seated in the saddle to resist detachment to a minimum of 200 inch-pounds of torque load.

According to a further feature of the invention, where two fittings are provided, at least one of these fittings may be constituted by a one-way check valve.

According to constructional features of the invention, the saddle has a transverse cross-section in which the saddle has a maximum thickness approximately equal to about one-half the height and width of the saddle. Furthermore, the fitting is in engagement with the saddle along about at least one-third of the length of the saddle. Still further, the fitting may occupy no more than about two-thirds of the maximum thickness.

The saddle has a transverse cross-section which is defined between a parabola and an arc of a circle. The saddle may have two planar and parallel end faces relative to which the aforesaid fitting or fittings is or are perpendicularly disposed. The saddle may, furthermore, have a longitudinal axis which is parallel to the fitting.

The above and further objects, features and advantages of the invention will become apparent from the detailed description which follows hereinafter as illustrated in the accompanying drawing.

BRIEF DESCRIPTION OF THE DRAWING

FIG. 4 is a sectional view taken along line IV—IV of FIG. 3;

FIG. 5 is a bottom view of the saddle illustrated in FIG. 3; and

FIG. 6 is a diagrammatic sectional view of another embodiment of the invention.

DETAILED DESCRIPTION

Figure 1:
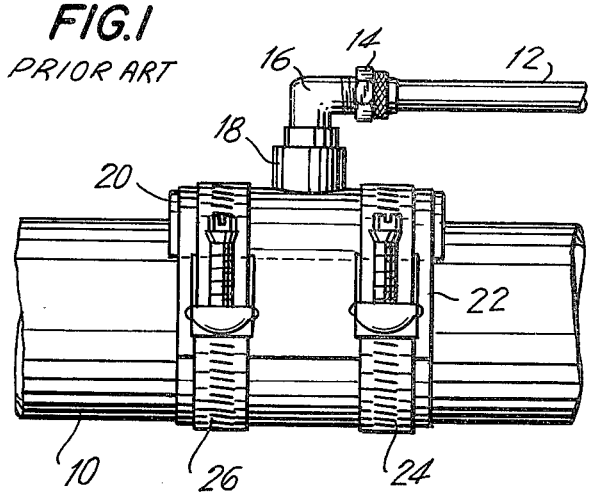
FIG. 1 is a side view of a pressurized cable having a pneumatic coupling thereon in accordance with the prior art.

According to the prior art illustrated in FIG. 1, it is known to provide a connection between a pressurized cable 10 containing a plurality of conductors and hose 12 adapted for being connected to a source of pressure medium or the like.

As illustrated, the hose 12 is connected by a threaded connection 14 to a metallic elbow 16 accommodated in a bushing (not shown) by threaded engagement, the bushing being accommodated in a flange 18 provided on a saddle 20 against which is held a metal strip 22 held in position by straps 24 and 26. This structure is illustrated and described in Bell System Practices Handbook, Section 637-235-201 referred to hereinabove. Also shown therein is a sealing compound accommodated between the saddle 20 and the outer surface of the cable 10 in which a peripheral opening is provided by way of which access is afforded as between cable 10 and hose 12.

The above described fitting has been used with substantial success for an extended period of time. However, there are a number of difficulties which have been encountered, which according to the objects of the invention, may be readily avoided at no additional expense and at the accomplishment of great convenience.

One of the difficulties characterizing the fitting of the prior art is that an elbow connection is required. Another difficulty is that this elbow projection causes the coupling as well as the associated hose to be elevated above the cable in exposed position, whereat the connection is readily damaged or destroyed by external forces generally supplied by maintainance personnel working on the equipment.

Yet another objectionable characteristic to which the fitting of the prior art is exposed is the minimum possible engagement between the metallic fitting and the flange 18, as a result of which the fitting may readily be destroyed by relatively low torque loads.

Figure 2:
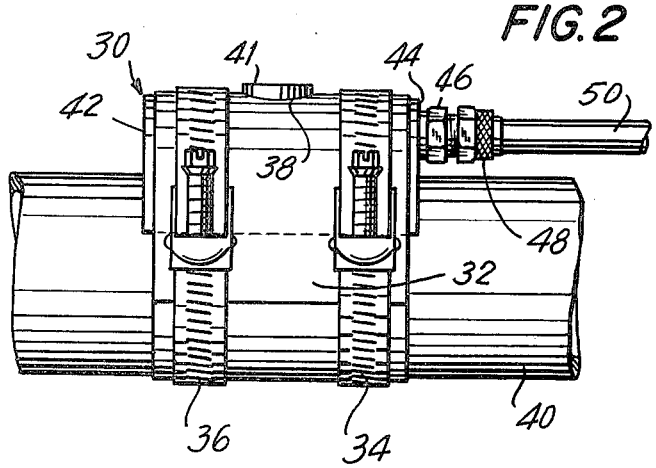
FIG. 2 is a view corresponding to FIG. 1 illustrating the pneumatic coupling of the invention.

These difficulties and undesirable characteristics are readily avoided by the approved fitting or coupling illustrated in FIG. 2, whereat it is seen that the coupling comprises a saddle 30 covered by a metal strip 32 held in position by straps 34 and 36. The strip 32 is provided with an opening 38 through which protrudes an orientation protrusion 41.

In accordance with the invention, the saddle is provided with two end faces 42 and 44 which are generally parallel and perpendicular to the longitudinal axis of the saddle.

In further accordance with the invention, there is provided a metal insert indicated at 46 in cantilever relation to face 44 and having an axis which is perpendicular to faces 42 and 44 and generally parallel to the longitudinal axis of the saddle 30, as well as to the cable indicated at 40. The cable 40 is a pressurized cable known from the prior art as requiring the supply of a pressurized medium such as air or the like for purposes of avoiding the penetration of moisture and fluids from the surrounding terrain.

It will be observed from the embodiment of the invention illustrated in FIG. 2 that the fitting 46 has threadably connected thereto by means of connection 48, a hose 50 such that the hose 50 and the fitting 46 are shielded by the profile of the saddle 30. More particularly, the saddle 30 is of a sufficient height that it extends above the insert 46 and hose 50, whereby the insert and hose are generally shielded from forces which might otherwise be applied thereto as in connection with the prior art.

Figure 3:
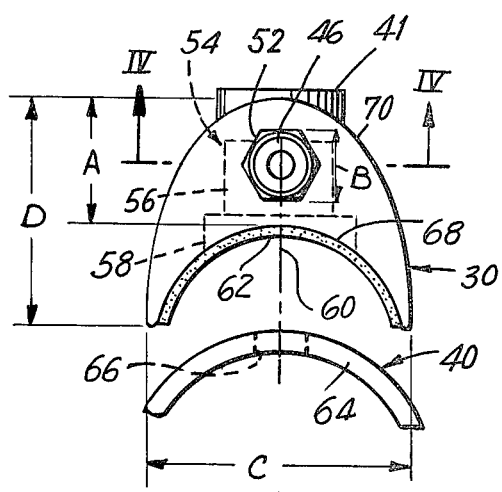
FIG. 3 is an end view of the saddle of the invention illustrating the metallic fitting therein with the saddle superposed over the wall of a pressurized cable.

FIG. 3 illustrates an end view of the saddle 30 appearing in FIG. 2. Herein is shown the insert 46 with its hexagonal tightening part 52, there being apparent in FIG. 3 the bore 54 having a first section 56 and a second section 58. Section 58 is of greater diameter than section 56, although both are aligned along an axis 60 extending perpendicularly to the fitting or insert 46.

Also seen in FIG. 3 is a sealing compound 62 provided in sheet form and generally concealed before use with a sheet of release paper which, normally, during storage protects the surface of the sealing compound 62. Also seen in FIG. 3 is the wall 64 of cable 40 provided with an opening 66 in the periphery thereof, as a result of which communication can be made pneumatically with the interior of the cable 40.

It will be observed that the surface 68, which constitutes the inner surface of saddle 30, is generally in the form of an arc of a circle which defines a concavity having a longitudinal axis which is adapted to lie parallel to cable 40. The outer surface 70 of the saddle is generally in the shape of a parabola. Thus, the transverse cross-section of the saddle is defined generally between a parabola and an arc of a circle.

The orientation protrusion is indicated at 41. This protrusion is generally of a circular cross-section and extends to opening 38 (FIG. 2) provided in strap 32 for accommodating protrusion of orientation means 41.

The maximum thickness of the saddle 30 is indicated at A. This maximum thickness occurs along the axis 60. The corresponding dimension of the hexagonal part 52 of the insert is indicated at B. This dimension is generally no more than two-thirds the maximum thickness indicated at A relative to the saddle 30.

The width of the cross-section of the saddle is indicated at C and the height of the saddle is indicated at D. It will be observed that the maximum thickness of the saddle indicated at A is approximately one-half the width or the height of the saddle indicated at C and D, respectively.

As illustrated in FIG. 4, the saddle has a length generally indicated at E, whereas the insert extends into the saddle by a distance indicated at F. It will be noted that, generally and preferably, the dimension F is at least one-third of the dimension E, thereby providing for a maximum coupling between the insert and the saddle, whereby to maximize the amount of torque load which can be resisted by the insert before the latter becomes detached from the saddle. In fact, the inserts molded into the saddle in this fashion are preferably seated such as to remain bonded to the saddle under a minimum of 200 inch-pounds of torque load applied in a torsional direction.

Further seen in FIG. 4 is the bore section 56 from which extends a small bore section 74 extending perpendicularly thereto. Thus, a pneumatic coupling is provided through bore 76 provided in insert 46 through bore 74 into bore 56 and thence through bore section 58 (FIG. 3) into opening 66 provided peripherally in the wall 64 of cable 40.

FIG. 5 illustrates a bottom view of the saddle appearing in FIG. 3. Herein can particularly be seen the bore section 56, as well as the bore section 58. It will be noted that the bore section 58 is extended by rectilinear portions 78 and 80 connecting to arcuate sections 82 and 84. The purpose of the extended configuration of bore section 58 is to permit for ready coupling with the opening 66 in cable 40 without precise adjustment being required as between the saddle and the cable.

A further embodiment of the invention is illustrated in FIG. 6, wherein is illustrated a saddle 100. The saddle 100 has a bore 102 running partly therethrough and perpendicular to a bore 104. The bore 104 has an enlarged section 106 in the manner described above and for the same reasons.

The embodiment of FIG. 6 differs from that of FIG. 2 in that two metallic inserts are provided. One of the inserts appears in the form of a metallic bushing 108 into which a threaded engagement is made by a threaded end of metallic valve 110 affording a pneumatic coupling through bore 102 and bore sections 104 and 106, whereby communication with a pressurized cable is possible.

In further accordance with the embodiment illustrated in FIG. 6, there is provided a second insert 112 consisting of a one-way check valve accommodated in casing 116 and permitting air flow only in the direction indicated, for example, by the arrow 114. Thereby communication is provided in one direction into the bore 104 via bore part 106 into the pressurized cable, whereas return flow is not permitted.

It will be noted that the check valve has a bore, the axis of which is coaxial with that of the valve 110. It will also be noted that both of these valves or inserts are provided in such a manner as to have a T relationship with the bore sections 104 and 106.

Further, it should be noted that both of the valves or inserts are provided by the profile of the saddle 100, the maximum height of which is such as to provide a protective shoulder above both of these valves or inserts, whereby damage to the latter is avoided.

From what has been stated hereinabove, it will now be appreciated that there is provided in accordance with the invention, apparatus for pneumatically communicating with a pressurized cable provided with a peripheral opening, said apparatus comprising a saddle of resilient material adapted to sit astride said cable in surrounding relationship with said opening, and a pneumatic fitting in said saddle in generally parallel relationship with said cable. Said saddle may be provided with a bore communicating with said fitting and generally perpendicular thereto, said bore being adapted to communicate with said opening.

According to the invention, the saddle is preferably of a material such as an elastomer or of a suitable natural rubber having a durometer of about 60–80, Shore A scale. Ranges of 50–90 can be accommodated, but preferably the durometer of the material is in the range of about 70.

The fitting or coupling of the invention employs a metal strip at least substantially covering the saddle with spaced strap holding the strip against the saddle and holding the saddle on the cable. A sealing compound is employed between the saddle and cable.

According to the invention, an orientation means is provided on the saddle in alignment with the bore in the saddle and protruding through a hole provided in the aforesaid strip. This orientation means provides for orientation with the opening in the cable.

The hose connected with a fitting employed in accordance with the invention is generally shielded, as is the fitting, by the shoulder of the saddle which has a maximum thickness providing for a shoulder which is adapted to shield the hose and insert from external forces applied, perhaps, by maintenance personnel.

The bore provided in the saddle of the invention has a diameter or dimension which increases towards the cable to afford a ready alignment between the same and the opening provided in the cable.

According to the second embodiment of the invention, there has been illustrated a second pneumatic fitting generally coaxial with the first employed fitting and communicating with the bore in the saddle, said fittings being in a generally T-shaped relationship with the bore.

The fittings and inserts are seated in the saddle to resist detachment to a minimum of 200 inch-pounds torque load. One of the fittings may be, as indicated above, a one-way check valve.

The saddle preferably has a transverse cross-section in which the saddle has a maximum thickness approximately equal to about one-half the height and width thereof. The insert or fitting is in engagement with the saddle along at least one-third the length of the saddle. The fitting occupies no more than about two-thirds of the maximum thickness.

The cross-section of the saddle is preferably defined between a parabola and an arc of a circle. The saddle has two planar and parallel end surfaces relative to which the fittings or inserts are perpendicularly disposed. The saddle, furthermore, has a longtidinal axis parallel to the fitting or insert.

Although there has been generally indicated above the use of elastomers or natural rubber for the saddle provided in accordance with the invention, there is preferably employed BUNA "N" having a durometer of 70, which preferably should not be varied by more than ± 10 since it may then either be too soft to insure structural integrity, or it may creep and result in an air leak, bearing in mind that the item is a pressure vessel that must withstand internal pressures of from 0 to 30 psig. If the durometer is too high, it will cause the flange to be so hard that its geometry will not vary properly to insure accommodating the full range of cable sizes to be accommodated.

The breakaway torque of the previously known couplings lies within a range of 75–120 inch-pounds. By breakaway torque one refers to the torque required to shear the metallic insert from the saddle body material rendering the same useless. The saddle of the invention and the insert which is preferably molded therein, exhibits the characteristic of a relatively high breakaway torque of between 350–450 inch-pounds. If actual dimensions are compared, it will be seen that the saddle of the invention provides for a 240% greater surface area than is available in the saddle of the prior art. This permits a greater bond between the metal insert and the resilient body in which it is accommodated.

There will now be obvious to those skilled in the art many modifications and variations of the structures set forth hereinabove. These modifications and variations will not depart from the scope of the invention as defined by the following claims.

What is claimed is:

1. Apparatus for pneumatically communicating with a pressurized cable provided with a peripheral opening, said apparatus comprising a saddle of resilient material adapted to sit astride said cable in surrounding relationship with said opening, said saddle having two end faces and defining a concavity having a longitudinal axis, and a pneumatic fitting extending out of one of the end faces of said saddle in cantilever relation thereto and in generally parallel relationship with said axis, said saddle having a profile shielding said fitting.

2. Apparatus as claimed in claim 1 wherein said saddle is provided with a bore communicating with said fitting and being arranged generally perpendicular thereto, said bore being adapted to communicate with said opening.

3. Apparatus as claimed in claim 2 wherein said saddle is of a material having a durometer of about 60–80 show A scale.

4. Apparatus as claimed in claim 2 comprising a metal strip at least substantially covering said saddle and spaced straps holding said strip against said saddle and adapted for holding said saddle on said cable.

5. Apparatus as claimed in claim 4 comprising a sealing compound on said saddle and adapted for being sandwiched between said saddle and cable.

6. Apparatus as claimed in claim 5 comprising orientation means on said saddle in alignment with said bore and protruding through a hole provided in said strip.

7. Apparatus as claimed in claim 4 comprising a hose connected to said fitting.

8. Apparatus as claimed in claim 2 wherein said bore has a diameter which increases towards said concavity.

9. Apparatus as claimed in claim 2 comprising a second pneumatic fitting generally coaxial with the first said fitting and communicating with said bore, said fittings being in a generally T-shaped relationship with said bore.

10. Apparatus as claimed in claim 9 wherein one of said fittings is a one-way check valve.

11. Apparatus as claimed in claim 2 wherein said saddle is of a material having an engagement with said fitting capable of resisting detachment of said fitting to a minimum of 200 inch-pounds torque load.

12. Apparatus as claimed in claim 2 wherein said saddle has a transverse cross-section in which the saddle has a maximum thickness approximately equal to about one-half the height and width thereof.

13. Apparatus as claimed in claim 12 wherein the fitting occupies no more than about two-thirds of said maximum thickness.

14. Apparatus as claimed in claim 12 wherein said cross-section is defined between a parabola and an arc of a circle.

15. Apparatus as claimed in claim 2 wherein said fitting is in engagement with said saddle along about at least one-third the length of the saddle.

16. Apparatus as claimed in claim 2 wherein said faces are planar and parallel end faces relative to which said fitting is perpendicularly disposed.

17. Apparatus as claimed in claim 2 wherein said saddle has a longitudinal axis parallel to said fitting.

* * * * *